United States Patent
Goto et al.

(10) Patent No.: US 9,952,449 B2
(45) Date of Patent: Apr. 24, 2018

(54) PRESBYOPIA CONTACT LENS SET

(71) Applicant: MENICON CO., LTD., Nagoya-shi, Aichi (JP)

(72) Inventors: Yuji Goto, Kasugai (JP); Hiroyuki Yamaguchi, Nagoya (JP)

(73) Assignee: MENICON CO., LTD., Nagoya-shi (JP)

( * ) Notice: Subject to any disclaimer, the term of this patent is extended or adjusted under 35 U.S.C. 154(b) by 0 days.

(21) Appl. No.: 14/906,698

(22) PCT Filed: Aug. 1, 2013

(86) PCT No.: PCT/JP2013/004680
§ 371 (c)(1),
(2) Date: Jan. 21, 2016

(87) PCT Pub. No.: WO2015/015536
PCT Pub. Date: Feb. 5, 2015

(65) Prior Publication Data
US 2016/0161763 A1 Jun. 9, 2016

(51) Int. Cl.
*G02C 7/04* (2006.01)
*G02C 7/02* (2006.01)

(52) U.S. Cl.
CPC ............ *G02C 7/044* (2013.01); *G02C 7/024* (2013.01); *G02C 7/027* (2013.01); *G02C 7/041* (2013.01)

(58) Field of Classification Search
CPC ........ G02C 7/024; G02C 7/044; G02C 7/027; G02C 7/028; G02C 7/04; G02C 7/041
(Continued)

(56) References Cited

U.S. PATENT DOCUMENTS 4,580,882 A 4/1986 Nuchman et al.
6,210,005 B1* 4/2001 Portney .................. A61F 2/14
351/159.43
(Continued)

FOREIGN PATENT DOCUMENTS

EP 0 942 312 A2 9/1999
JP S59-208524 A 11/1984
(Continued)

OTHER PUBLICATIONS

Feb. 2, 2016 International Preliminary Report on Patentability issued in International Patent Application No. PCT/JP2013/004680.
(Continued)

*Primary Examiner* — Jordan Schwartz
(74) *Attorney, Agent, or Firm* — Oliff PLC

(57) ABSTRACT

A presbyopia contact lens set especially for a user who has worn spherical contact lenses, a designing method for a presbyopia contact lens, and a manufacturing method for a presbyopia contact lens that uses such design method. The presbyopia contact lens set configured by combining a plurality of types of presbyopia contact lens having different specifications lens powers, includes the plurality of types of presbyopia contact lenses in which the radial lens power profile in a near-use region and that in a far-use region are defined using mutually different functions, the function for defining the radial lens power profile in the far-use region is set in accordance with a specifications lens power, and the radial lens power rate-of-change in the far-use region is made larger for lenses having a small specifications lens power than for lenses having a large specifications lens power.

13 Claims, 6 Drawing Sheets

(58) Field of Classification Search
USPC ............ 351/159.06, 159.02, 159.05, 159.12, 351/159.74
See application file for complete search history.

(56) References Cited

U.S. PATENT DOCUMENTS

| | | | |
|---|---|---|---|
| 6,260,966 B1 | 7/2001 | Sawano et al. | |
| 2004/0085515 A1* | 5/2004 | Roffman | G02C 7/044 351/219 |
| 2004/0150790 A1* | 8/2004 | Roffman | G02C 7/042 351/159.08 |
| 2009/0051870 A1* | 2/2009 | Lindacher | G02C 7/028 351/159.41 |
| 2010/0321632 A1* | 12/2010 | Sanger | A61F 2/1618 351/159.41 |
| 2011/0032474 A1* | 2/2011 | Lindacher | A61F 2/1613 351/159.06 |
| 2013/0201454 A1* | 8/2013 | Back | G02C 7/041 351/247 |
| 2014/0168602 A1* | 6/2014 | Weeber | A61F 2/1637 351/159.44 |
| 2015/0234203 A1* | 8/2015 | Ho | G02C 7/047 351/159.06 |

FOREIGN PATENT DOCUMENTS

| | | |
|---|---|---|
| JP | S63-95415 A | 4/1988 |
| JP | H05-181096 A | 7/1993 |
| JP | H11-503250 A | 3/1999 |
| JP | H11-295668 A | 10/1999 |
| JP | 2000-075251 A | 3/2000 |
| JP | 2005-208296 A | 8/2005 |
| JP | 2009-544059 A | 12/2009 |
| JP | 2011-516923 A | 5/2011 |
| WO | 00/63740 A1 | 10/2000 |

OTHER PUBLICATIONS

Oct. 22, 2013 International Search Report issued in International Patent Application No. PCT/JP2013/004680.
Nov. 30, 2015 Office Action issued in Japanese Patent Application No. 2015-529223.
Feb. 22, 2017 Search Report issued in European Patent Application No. 13890507.0.

* cited by examiner

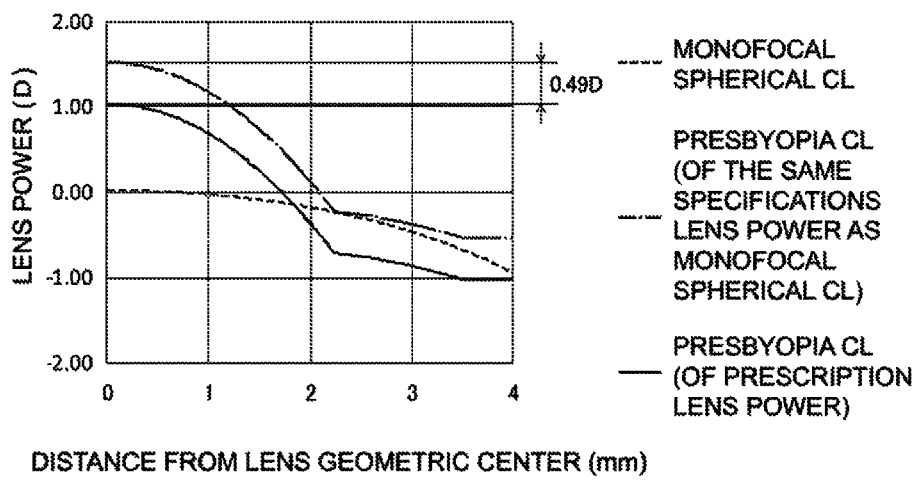
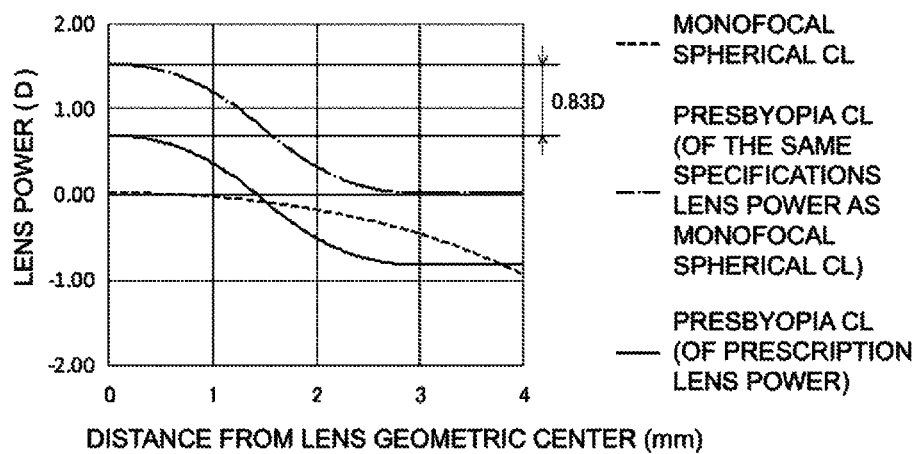

PRESBYOPIA CONTACT LENS SET

TECHNICAL FIELD

The present invention relates to technology related to presbyopia contact lenses that make it possible to compensate for deteriorated vision accommodation ability while keeping good quality of vision (QOV) for presbyopic eyes, and also relates to a presbyopia contact lens set made by combining a specific plurality of types of presbyopia contact lenses that can be selected for application, and relates to a designing method and a manufacturing method for presbyopia contact lenses.

BACKGROUND ART

Presbyopia contact lenses that are applied to presbyopic eyes to compensate for deteriorated vision accommodation ability are known from the past. A presbyopia contact lens has a plurality of regions provided with different lens powers set within the optical region of a single contact lens. Specifically, the optical region of the presbyopia contact lens has a near region with a suitable lens power set for when doing nearby observation and a distance region with a suitable lens power set for when doing far distance observation. Furthermore, when necessary, an intermediate region or a transition region, wherein a lens power that is adjusted to intermediate distance observation is set, is provided therefor.

Also, by selectively or simultaneously using the near region and the distance region, eyesight correction is performed according to the needed distance. For example, as an alternative vision type presbyopia contact lens used for which the near region and the distance region are used selectively, there is the item noted in Japanese Unexamined Patent Publication No. JP-A-63-95415 (Patent Document 1). For the item, it is possible to obtain the necessary visual acuity by moving the visual axis to have regions of different lens powers selectively used. Also, as a simultaneous vision type presbyopia contact lens for which the near region and the distance region are used simultaneously, there is the item noted in Japanese Unexamined Patent Publication No. JP-A-59-208524 (Patent Document 2). For the item, by simultaneously observing regions of different lens powers and having the brain make a judgment, the necessary images are selected and recognized, and it is possible obtain the necessary visual acuity.

However, in the case of either the alternative vision type or the simultaneous vision type, the prior presbyopia contact lenses, as with Patent Document 1, were bifocal types for which fixed lens powers were set for both the near region and the distance region. In addition to this, in recent years, for at least one of the near region and the distance region, progressive type (progressive multifocal type) presbyopia contact lenses for which non-step changing lens powers were set were provided (see Patent Document 2).

This progressive type presbyopia contact lens is able to give an optical focal point to a continuously changing seeing distance, so compared to the bifocal type presbyopia contact lens, we can expect provision of natural vision to the user by compensating for the vision accommodation ability of the eye optical system in non-step form. Because of that, for both presbyopia contact lens users and prescribers, many are selecting progressive type presbyopia contact lenses because they anticipate having the eye focus to continuously match as the seeing distance changes to see items of any distance well.

However, according to an investigation by the inventors of the present invention, when progressive type presbyopia contact lenses were actually worn, it became clear that there were many cases of not being satisfied with vision. In fact, suitability of presbyopia contact lenses that can provide satisfactory vision depends on the individual, and in the past, it was difficult to select the optimal presbyopia contact lens for each user.

Specifically, it is also conceivable to prepare in advance many types of presbyopia contact lens with differing lens power, additional diopter power, power profile and the like so as to select the optimal item by trying them on each individual and comparing. However, with that kind of handling method, not only does the seller have to have many types of contact lenses available in advance, but it is also necessary for the user to repeatedly put on and take off the contact lenses many times. This is a forced time and physical burden on both the user and prescriber, and is not practical.

BACKGROUND ART DOCUMENT

Patent Document

Patent Document 1: JP-A-63-95415
Patent Document 2: JP-A-59-208524

SUMMARY OF THE INVENTION

Problem the Invention Attempts to Solve

The present invention has been developed in view of the above-described matters as the background, and it is objects of the present invention to provide a novel presbyopia contact lens set for which is able to efficiently give presbyopia contact lenses suited to the user without requiring excessive trial use or the like of many types of lenses.

Also, the present invention also has an object of providing a designing method and manufacturing method of a presbyopia contact lens that can suit to the user and give good vision.

Means for Solving the Problem

The above and/or optional objects of this invention may be attained according to at least one of the following modes of the invention. The following modes and/or elements employed in each mode of the invention may be adopted at any possible optional combinations.

First, in order to identify the causes of dissatisfaction with vision with presbyopia contact lenses which are selected based on specifications lens power and additional diopter power being set depending on the level of presbyopia, myopia, and hyperopia according to the conventional method, upon doing further study and investigation, the inventors of the present invention obtained a new finding. Namely, users who wore monofocal spherical myopia or hyperopia contact lenses from the past, are likely to feel dissatisfaction in view when wearing presbyopia contact lenses, especially.

Also, as a reason for this kind of dissatisfaction with vision, the inventors of the present invention came to think that this was because the depth of focus does not change or in fact becomes shallower for the user who used to wear single focus spherical contact lenses with a high value of the depth of focus or the depth of field due to a spherical aberration (hereafter, depth of focus) changed to presbyopia contact lenses. Specifically, with monofocal spherical contact lenses, as the absolute value of the lens power becomes greater, the depth of focus becomes deeper due to spherical aberration, so that some users who wore high power single focus spherical contact lenses, even when shifting to presbyopia contact lenses, fail to obtain a deeper depth of focus than before the shift. The inventors came to think that in such cases, the users might feel a sense of discomfort with peripheral vision or fail to easily obtain matching focus owing to an increase in the accommodation range, so that they feel dissatisfaction with vision.

A first mode of the present invention, which was created based on the new knowledge obtained in this way, provides a presbyopia contact lens set comprising: a plurality of presbyopia contact lenses which are assorted by different specifications lens powers applied thereto, each including an optical zone having a near region at its center part and a distance region at its peripheral part, the presbyopia contact lens set being characterized in that: a radial lens power profile with the near region is defined by a first function, and a radial lens power profile with the distance region is defined by a second function that is different from the first function, the second function defining the radial lens power profile with the distance region is set depending on the specifications lens powers so that the plurality of presbyopia contact lenses include the presbyopia contact lenses where a rate-of-change of a radial lens power with the distance region is made larger as the specifications lens power is made smaller.

With this kind of presbyopia contact lens set constituted according to the first mode, the function that defines the radial lens power profile with the distance region is set according to the specifications lens power such that a rate-of-change of a radial lens power with the distance region is made larger as the specifications lens power is made smaller. By so doing, with a plurality of presbyopia contact lenses with different specifications powers constituting the presbyopia contact lens set, the difference in the depth of focus of the spherical contact lens according to the specifications lens power due to a difference in the spherical aberration or the like is intentionally set by the radial lens power profile of the distance region.

Therefore, even when a user who has been wearing monofocal spherical contact lenses with the goal of correcting myopia or hyperopia, for example, switches to the presbyopia contact lenses and wears them, it is possible to provide them without significantly changing the quality of vision such as of the depth of focus due to the spherical aberration which the user is used to with the monofocal spherical contact lenses he/she has used continuously from the past.

Specifically, since the minus spherical aberration becomes larger as the minus lens power becomes larger in the monofocal spherical contact lenses, prescribing presbyopia contact lenses of the same specifications lens power according to the conventional art, which have the spherical aberration substantially inhibited due to setting of both lens powers for near and distance uses, might lead to strange feeling and dissatisfaction in vision. Here, with the present invention, the rate-of-change of the lens power of the distance region is set according to the specifications lens power, and the lens power profile with the distance region is set taking into consideration the spherical aberration of the spherical contact lens. Therefore, even if the contact lens of the present invention has the same specifications lens power as the conventional presbyopia contact lens, it is possible to provide good vision for a distant visual recognition object using a large depth of focus.

In fact, by setting the lens power profile of the distance region for each specifications lens power, the corrected distance vision approaches the corrected distance vision by the monofocal spherical contact lenses. Therefore, for a user switching from the monofocal spherical contact lenses to the presbyopia contact lenses, it is possible to prescribe the presbyopia contact lenses of the same or roughly the same specifications lens power. By so doing, it is easier for a prescriber to prescribe presbyopia contact lenses that are suitable for the user, and a smooth shift from the monofocal spherical contact lenses to the presbyopia contact lenses can be realized.

The second mode of the present invention is the presbyopia contact lens set according to the first mode, wherein the plurality of presbyopia contact lenses include the presbyopia contact lenses where the rate-of-change of the radial lens power with the distance region is set to have a difference of ±0.2 D/mm or less with respect to a rate-of-change of a radial lens power of a spherical contact lens of a same specifications lens power.

With the second mode, by the rate-of-change of the lens power of the distance region being set to be close to the rate-of-change of the radial lens power of the spherical contact lens due to the spherical aberration or the like, the optical characteristics of the distance region of the presbyopia contact lenses approaches the optical characteristics of the spherical contact lenses of the same specifications lens power. As a result, when switching from the spherical contact lenses to the presbyopia contact lenses, the user's sense of discomfort or dissatisfaction with vision is reduced or eliminated, and it is possible to provide excellent vision.

With the presbyopia contact lenses according to this mode which have a difference of ±0.2 D/mm or less in the rate-of-change of the lens power with respect to the spherical contact lens, it is desirable to set the contact lenses so as to have the specifications lens powers which are equal to or less than a threshold value. The threshold value is set in advance within a range of −5 D to −2 D. This is because it is easy for a high value of the depth of focus to be a problem especially when the minus diopter value is large.

The rate-of-change of the lens power, as is generally known, can be found by differentiating the function that defines the radial lens power profile, and also can be found by calculating the slope from two point coordinates on a curved line indicating the radial lens power profile.

The third mode of the present invention is the presbyopia contact lens set according to the first or second mode, wherein the plurality of presbyopia contact lenses include the presbyopia contact lenses where a lens power in the distance region is set to have a difference of ±1.0 D or less with respect to a lens power of a spherical contact lens of a same specifications lens power.

With the third mode, by the lens power of the distance region of the presbyopia contact lenses being set to be close to the lens power of the spherical contact lenses of the same specifications lens power, when switching from the spherical contact lenses to the presbyopia contact lenses, it is possible to provide distance vision close to the distance vision in wearing the spherical contact lenses by using the presbyopia contact lenses of roughly the same specifications lens power. Therefore, prescribing of the presbyopia contact lenses is easy, and it is possible to have a smooth shift from contact lenses for myopia or hyperopia to presbyopia contact lenses.

With the presbyopia contact lenses according to this mode which have a difference of ±1.0 D or less in the lens power with respect to the spherical contact lens, it is preferable to set the contact lenses so as to have the specifications lens powers which are equal to or less than a threshold value. The threshold value is set in advance within a range of −5 D to −2 D. This is because it is easy for the high value of the depth of focus to become a problem especially when the minus diopter value is large.

The fourth mode of the present invention is the presbyopia contact lens set according to any of the first to third modes, wherein the plurality of presbyopia contact lenses include the presbyopia contact lenses where, with each the near region and the distance region, a lens power at an outermost circumference is more negative than a lens power at an innermost circumference, and there is no inflection point at which a rate-of-change of a radial lens power turns positive.

With the fourth mode, it is possible to reduce deterioration in vision due to halation, glare or the like, and possible to provide stable vision. In particular, in cases such as when viewing a point light source such as a headlight of an automobile at night or the like, it is also possible to inhibit marked deterioration in vision.

The fifth mode of the present invention is the presbyopia contact lens set according to any of the first to fourth modes, wherein the plurality of presbyopia contact lenses include the presbyopia contact lenses where a difference between a maximum value and a minimum value of a lens power in the distance region is 0.3 D or more.

With the fifth mode, it is possible to even more advantageously obtain an effect of increasing the depth of focus using the lens power profile of the distance region, and possible to provide excellent vision with a broad accommodation range.

The sixth mode of the present invention is the presbyopia contact lens set according to any of the first to fifth modes, wherein the plurality of presbyopia contact lenses include the presbyopia contact lenses where a difference between a maximum value and a minimum value of a lens power in the near region is 2.5 D or less.

With the sixth mode, distortion of vision or the like due to a greatly positive additional diopter power is inhibited, and ensuring the depth of focus in the distance region is also advantageous, and it is possible to ensure an even better quality of vision overall.

The seventh mode of the present invention is the presbyopia contact lens set according to any of the first to sixth modes, wherein the plurality of presbyopia contact lenses are mutually same in terms of a difference between a maximum value and a minimum value of a lens power in the near regions.

With the seventh mode, it is possible to set the depths of focus with the near regions to be roughly equal, and for example, it is possible to even more effectively inhibit the sense of discomfort for the near region when changing to the presbyopia contact lenses for which the specifications lens power changes in accordance with the progress of the level of presbyopia. Also, with this mode, the radial direction positions of the connection points of the near region and the distance region are set to be different according to the specifications lens power of the distance region. As a result, the ratio of areas of the near region and the distance region is also changed and set, and it is easy to set and ensure a large area of the distance region which will become necessary according to the progress of presbyopia.

The eighth mode of the present invention is the presbyopia contact lens set according to any of the first to sixth modes, wherein a diameter of the near region is 1.0 to 6.0 mm in the plurality of presbyopia contact lenses.

With the eighth mode, it is possible to set respectively sufficient radial direction dimensions with the near region and the distance region of the optical zone of a diameter which fits a human cornea size, and possible to set the radial lens power profile even more suitably respectively for the near region and the distance region.

The ninth mode of the present invention is the presbyopia contact lens set according to any of the first to eighth modes, wherein the plurality of presbyopia contact lenses include the presbyopia contact lenses where a constant power region where a lens power is fixed at a designated width in a radial direction is provided at an outer circumference side of the distance region.

With the ninth mode, by the constant power region being provided at the outer circumference side of the distance region, it is possible to increase the vision correction effect during far distance observation, and possible to make it easier to see far distance visual recognition objects. In fact, by a region for which the lens power is fixed being provided, it is also easier to measure the lens power when evaluating the optical characteristics of the presbyopia contact lens.

The tenth mode of the present invention is a designing method of a presbyopia contact lens which includes an optical zone having a near region at its center part and a distance region at its peripheral part, being characterized by comprising: setting a lens power profile corresponding to a spherical aberration of a spherical contact lens of a same specifications lens power as a radial lens power profile in the distance region of the presbyopia contact lens.

With the tenth mode, by the radial lens power profile for the distance region of the presbyopia contact lens being set so as to correspond to the spherical aberration of the spherical contact lens, when switching from the spherical contact lenses for myopia or hyperopia to the presbyopia contact lenses, it is possible to reduce or eliminate the sense of discomfort or dissatisfaction of the user with vision, and possible to easily provide excellent vision.

The eleventh mode of the present invention is the designing method of a presbyopia contact lens according to the tenth mode, wherein the radial lens power profile in the distance region is set so that a rate-of-change of a radial lens power in the distance region is different from a rate-of-change of a radial lens power of the spherical contact lens by ±0.2 D/mm or less.

With the eleventh mode, the rate-of-change of the lens power of the distance region approaches the rate-of-change of the radial lens power of the spherical contact lens due to the spherical aberration or the like, and the optical characteristics of the distance region of the presbyopia contact lenses can approach the optical characteristics of the spherical contract lenses of the same specifications lens power.

The twelfth mode of the present invention is the designing method of a presbyopia contact lens according to the tenth or eleventh mode, wherein the lens power profile in the distance region is set so that a radial lens power in the distance region is different from a radial lens power of the spherical contact lens by ±1.0 D or less.

With the twelfth mode, the lens power of the distance region of the presbyopia contact lenses is close to the lens power of the spherical contact lenses of the same specifications lens power, and it is possible to realize presbyopia contact lenses which can provide corrected distance vision close to when wearing the spherical contact lenses with roughly the same specifications lens power as the spherical contact lenses the user used to wear.

The thirteenth mode of the present invention is the designing method of a presbyopia contact lens according to any of the tenth to twelfth modes, further comprising designing a presbyopia contact lens set including a plurality of presbyopia contact lenses which are assorted by different specifications lens powers applied thereto such that a rate-of-change of a radial lens power with the distance region is made larger as the specifications lens power is made smaller.

With the thirteenth mode, by designing the presbyopia contact lenses of a plurality of types as a set considering the spherical aberration according to the specifications lens power of the spherical contact lenses the user used to wear, it is possible to easily provide presbyopia contact lenses according to the specifications lens power of the spherical contact lenses, and to prevent vision from becoming worse than when wearing monofocal spherical contact lenses.

The fourteenth mode of the present invention is a manufacturing method of a presbyopia contact lens being characterized by comprising: forming the distance region of the presbyopia contact lens having the radial lens power profile being set by the designing method of the presbyopia contact lens according to any of the tenth to thirteenth modes.

With the fourteenth mode, it is possible to manufacture and provide the presbyopia contact lenses equipped with the distance region having the lens power profile corresponding to the radial lens power profile of the spherical contact lens due to the spherical aberration or the like.

Effect of the Invention

With the present invention, it is possible to efficiently provide for each user presbyopia contact lenses that give good quality of vision. In particular, even when switching from spherical contact lenses for myopia or hyperopia to presbyopia contact lenses, for example, it is possible to reduce or eliminate the sense of discomfort or dissatisfaction with vision, and to easily provide excellent vision.

BRIEF DESCRIPTION OF THE DRAWINGS

FIGS. 9A and 9B show graphs of the radial lens power profile of presbyopia contact lenses used for a sensory test, where FIG. 9A shows an example of the present invention, and FIG. 9B shows a comparative example which has a conventional constitution.

EMBODIMENTS FOR CARRYING OUT THE INVENTION

Figure 1:
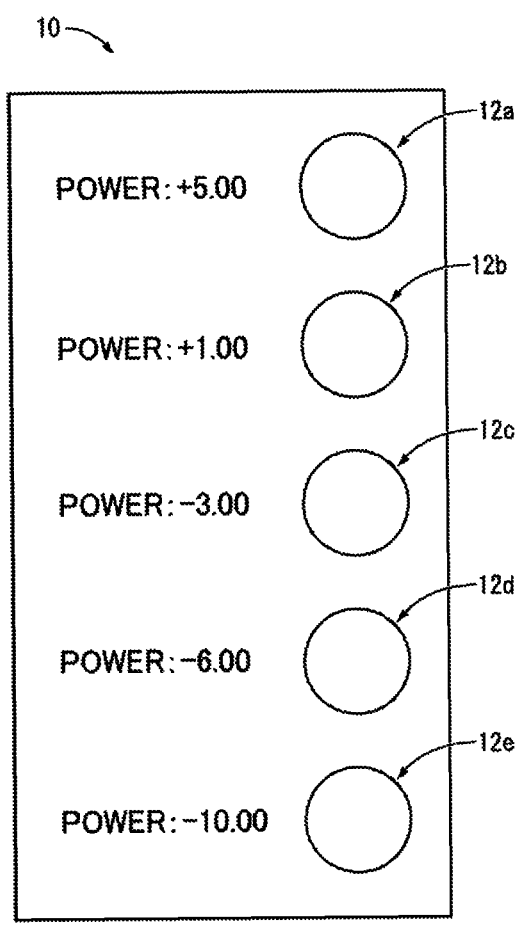
FIG. 1 is a view for explaining a presbyopia contact lens set as a first embodiment of the present invention.

Following, we will describe embodiments of the present invention while referring to the drawings.

First, FIG. 1 shows a presbyopia contact lens set 10 as a first embodiment of the present invention.

This presbyopia contact lens set 10 is constituted with presbyopia contact lenses 12a to 12e of a plurality of types (five types with this embodiment) which are assorted by different specifications or standard lens powers applied thereto. With this embodiment, the specifications lens powers of presbyopia contact lenses 12a and 12b are positive, and the specifications lens powers of the presbyopia contact lenses 12c to 12e are negative. Also, the plurality of types of presbyopia contact lenses 12a to 12e constituting the presbyopia contact lens set 10 of this embodiment have mutually the same additional diopter power (ADD) for nearby observation, but, for example, it is also possible to constitute the presbyopia contact lens set by combining a plurality of types of presbyopia contact lenses with different additional diopter powers in addition to specifications lens powers. When we say the specifications lens power is small, that means the minus power is large, and when we say the specifications lens power is large, that means the plus power is large.

Figure 2:
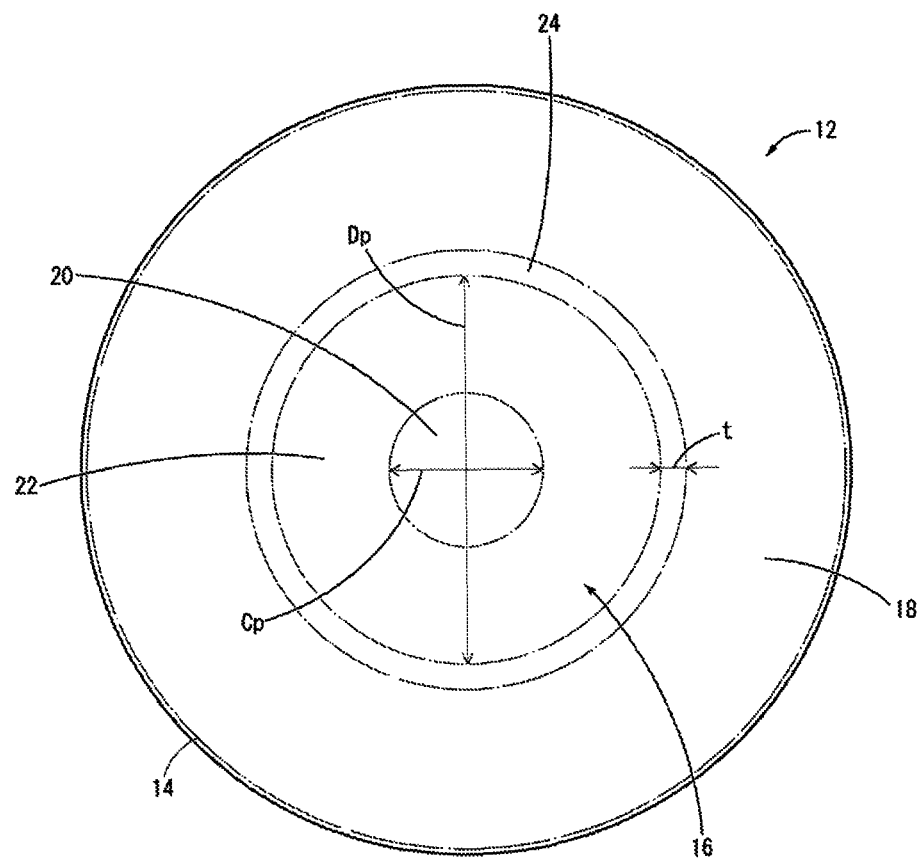
FIG. 2 is a front view of a presbyopia contact lens of the presbyopia contact lens set shown in FIG. 1.

In more detail, the presbyopia contact lens 12 has an outer surface shape for which the lens front surface, which has a convex spherical crown shape, and the lens back surface, which has a concave spherical crown shape, are smoothly connected at an edge part 14 of the lens outer circumference edge. Also, as shown in FIG. 2, at the center part of the presbyopia contact lens 12, a roughly circular optical zone 16 having optical characteristics for vision correction is provided with a designated diameter dimension. Meanwhile, between the optical zone 16 and the edge part 14 in the radial direction, a roughly ring shaped peripheral zone 18 that does not have optical characteristics is provided.

As the presbyopia contact lens 12 of the present invention, it is possible to use either the soft type or hard type. Here, either type of contact lens can be formed with various well known materials. As the soft contact lens, for example, biocompatible materials such as hydroxyethyl methacrylate (HEMA), N-vinyl pyrrolidone (N-VP), dimethyl acrylamide (DMAA), amino acid copolymer, silicone hydrogel for which silicone is joined to a hydrophilic gel or the like, can be suitably used. Meanwhile, as the hard contact lens, for example, materials such as methyl methacrylate (MMA), siloxanyl alkylmethacrylate (SMA) or the like can be used. Furthermore, as the presbyopia contact lens 12, it is also possible to use a two-material contact lens having the features of both soft type and hard type lenses, and for example, by forming the optical zone 16 with the hard type material and forming the peripheral zone 18 with the soft type material, it is possible to establish both excellent optical characteristics and wearing comfort.

Naturally, it is desirable for the presbyopia contact lenses 12a to 12e constituting one presbyopia contact lens set 10 to be unified to one type of any of the soft contact lens, the hard contact lens, and the two-material contact lens. With the presbyopia contact lens set 10 of this embodiment, all of the presbyopia contact lenses 12a to 12e constituting it are soft contact lenses, and the forming material is also the same.

Also, the presbyopia contact lens 12 is a simultaneous vision type, a near region 20 for which a plus side lens power is set is provided in the center part of the optical zone 16, and a distance region 22 for which a minus side lens power is set is provided in the peripheral part of the optical zone 16, which is the outer peripheral side of the near region 20. Also, in the state with the presbyopia contact lens 12 worn, the light beams passing through the near region 20 and the light beams passing through the distance region 22 are incident on the retina simultaneously. And of the images by that incident light, by the user's brain selecting the clearer one, it is possible to visually recognize both objects at near positions and objects at far positions.

Furthermore, at the outer circumference side of the distance region 22 with the optical zone 16, a ring shaped constant power region 24 is provided. The constant power region 24 is formed at a designated width in the radial direction, the lens power is roughly fixed in the radial direction (the rate-of-change in the radial direction of the lens power is roughly 0), and this contributes to improvement in distance vision, easier measurement of the lens power and the like. Naturally, the constant power region 24 is not an essential component of the present invention, and for example, it is also possible to omit this, and also possible to have a different rate-of-change from the inner circumference side of the distance region 22 and have the lens power change in the radial direction.

Also, with this embodiment, the difference between the lens power at the lens geometrical center of the near region 20 (maximum lens power) and the lens power at the outermost circumference of the near region 20 (minimum lens power) is set so as to be roughly fixed for the plurality of different types of presbyopia contact lenses 12a to 12e that constitute the presbyopia contact lens set 10.

Also, with the presbyopia contact lenses 12a to 12e, the diameters (Cp) of the near regions 20 are respectively set according to the radial lens power profile of the near region 20. Meanwhile, with the presbyopia contact lenses 12a to 12e, the outer diameter dimension (Dp) of the distance region 22 is roughly fixed. With this embodiment, the respective optical zones 16 of the presbyopia contact lenses 12a to 12e have roughly the same diameter as each other to match the size of a person's retina or the like. Accordingly, the radial direction dimension (t) of the constant power region 24 provided at the outer circumference side of the distance region 22 is roughly fixed. Said another way, with the respective optical zone 16 of the presbyopia contact lenses 12a to 12e, the radial direction dimensions of the distance region 22 are mutually different.

Figure 3:
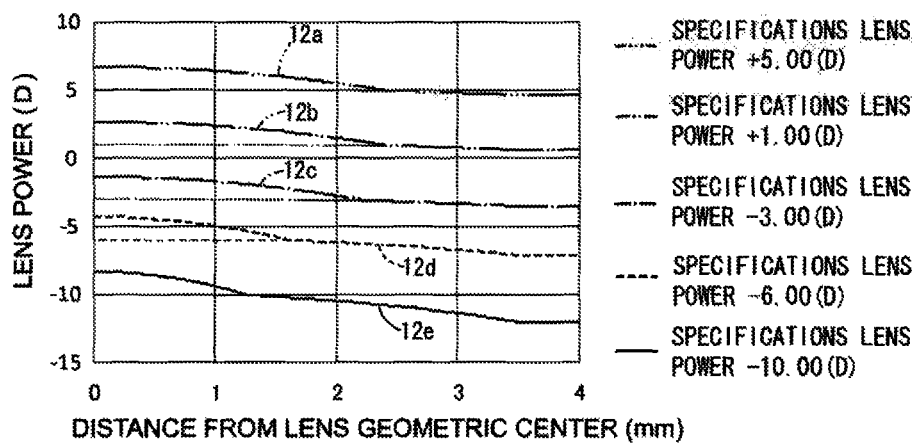
FIG. 3 is a graph showing the lens power profile which is the setting modes of the optical characteristics of the presbyopia contact lens shown in FIG. 2.
Figure 4:
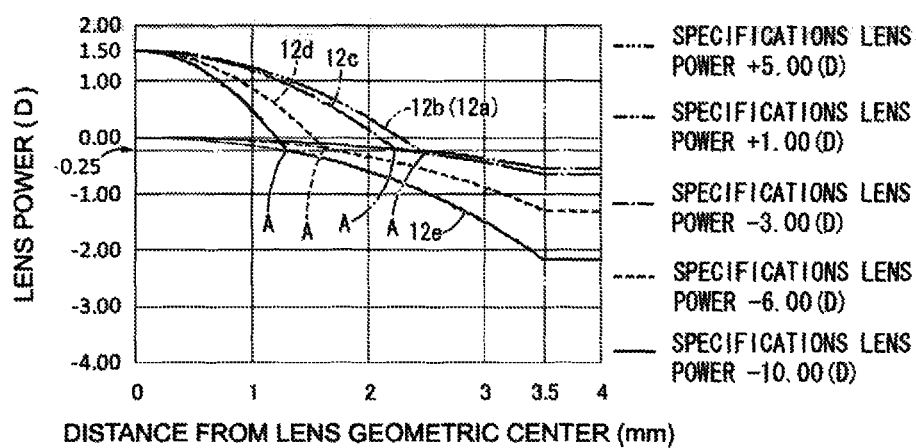
FIG. 4 is a graph showing the radial direction change volume of the lens power of the presbyopia contact lens shown in FIG. 2.

Also, the presbyopia contact lens 12 is a progressive type (progressive multifocal type) near/distance contact lens, and with this embodiment, the lens power continuously changes in the radial direction in both the near region 20 and the distance region 22. More specifically, as shown in the graphs in FIGS. 3 and 4, the lens power gradually becomes greater to the minus side as it goes to the radial direction outside with both the near region 20 and the distance region 22, and, in the radial lens power profile of the near region 20 and the distance region 22, there is no inflection point at which the rate-of-change of the radial lens power turns positive. By so doing, the radial lens power profiles with the near region 20 and the distance region 22, has a more negative value for the lens power at the outermost circumference than the lens power at the innermost circumference. To make it easier to understand the changes in lens power in the radial direction with a narrowed range of lens power shown on the vertical axis, the graph in FIG. 4 shows the curved line of lens power profile of each presbyopia contact lens 12a to 12e being set so that the specifications lens power position on the vertical axis is virtually 0 D. Also, with the graph in FIG. 4, A indicates the boundary of the near region 20 and the distance region 22, and further to the lens geometrical center side than A (the left side in the graph in FIG. 4) shows the near region 20, while further to the lens external circumference edge side than A (the right side in the graph of FIG. 4) shows the distance region 22.

Furthermore, in the near region 20 and the distance region 22, the radial lens power profiles are defined by functions mutually different, and the rates-of-change of the radial lens power are mutually different. With this embodiment, the radial lens power profiles for both the near region 20 and the distance region 22 are each defined by a quadratic function, and the lens power becomes continuously smaller (greater to the minus side) toward the radial direction outward from the lens geometric center, and the rate-of-change of the lens power in the radial direction becomes gradually larger toward the radial direction outward. With this embodiment, the radial lens power profile of the near region 20 is defined by the quadratic function shown below in Formula 1, and the radial lens power profile of the distance region 22 is defined by the quadratic function below in Formula 2. These defining equations (quadratic functions) can be items that are preset with the design, or can also be approximate equations found from the lens power measurement values. With Formula 1 and Formula 2, x is the distance from the optical axis, x0 is the starting point (x0=0) of Formula 1, x1 is the distance from the optical axis to the boundary A of the near region 20 and the distance region 22, and x2 is the distance from the optical axis to the outer circumference end of the distance region 22 which is the end point of Formula 2. Furthermore, p0 is the lens power on the optical axis (x0), p1 is the lens power with x1, and p2 is the lens power with x2.

$$\text{POWER}((x_0,p_0) \sim (x_1,p_1)) = [(p_0-p_1) \cdot x^2 + (p_1 \cdot x_0^2 - p_0 \cdot x_1^2)]/(x_0^2 - x_1^2) \quad \text{Formula 1}$$

$$\text{POWER}((x_1,p_1) \sim (x_2,p_2)) = [(p_1-p_2) \cdot x^2 + (p_2 \cdot x_1^2 - p_1 \cdot x_2^2)]/(x_1^2 - x_2^2) \quad \text{Formula 2}$$

Also, the rate-of-change of the lens power in the radial direction can be found by differentiating the functions shown in Formula 1 and Formula 2, and it is also possible to find this by calculating the tilt from two points (xa, pa), (xb, pb) on the functions shown in Formula 1 and Formula 2 using Formula 3.

$$(p_b - p_a)/(x_b - x_a) \quad \text{Formula 3}$$

Here, the function defining the radial lens power profile with the distance region 22 is set depending on the specifications lens powers of the presbyopia contact lenses 12a to 12e. In more specific terms, the radial lens power profile of the distance region 22 is designed based on the radial lens power profile of the monofocal spherical contact lens for correcting myopia or hyperopia. With each presbyopia contact lens 12a to 12e of this embodiment, the curve indicating the lens power profile of the distance region 22 is defined by one function, and the virtual lens power shown at the lens geometric center by that function (in FIG. 3, the intersection of the fine line extending from the curve showing the lens power profile of the distance region 22 and the graph vertical axis) is used as the specifications lens power of the presbyopia contact lens 12.

Figure 5:
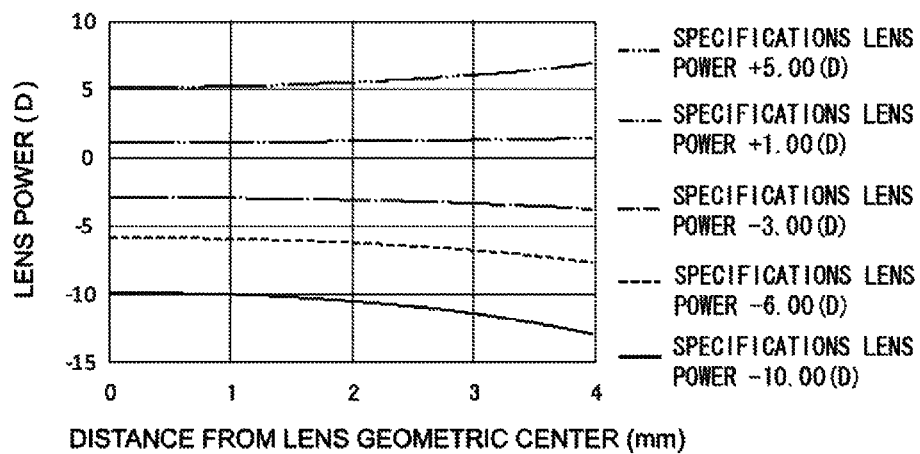
FIG. 5 is a graph showing the lens power profile of a monofocal spherical contact lens of the same specifications lens power as the presbyopia contact lens shown in FIG. 2.
Figure 6:
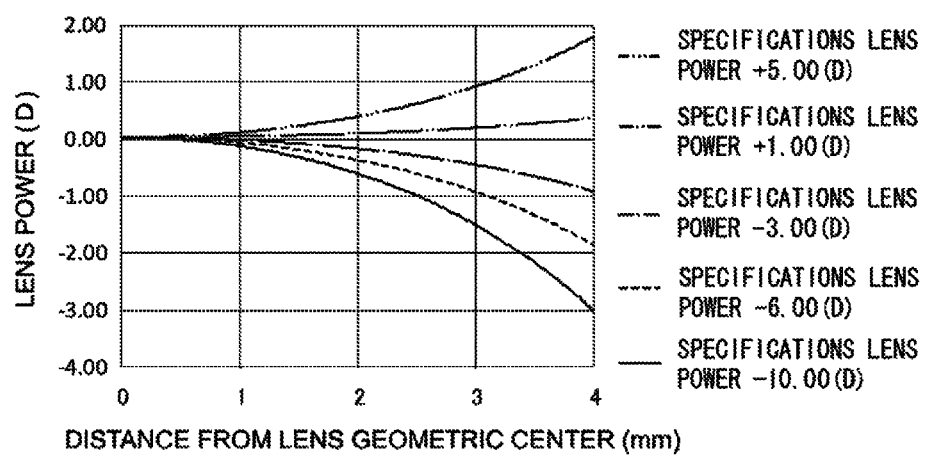
FIG. 6 is a graph showing the radial direction change volume of the lens power of the monofocal spherical contact lens shown in FIG. 5.

Specifically, with the monofocal spherical contact lens, as shown in FIGS. 5 and 6, the change volume of the lens power due to the spherical aberration or the like increases as it separates from the lens geometric center. In more specific terms, for example with the monofocal spherical contact lens whose lens power at the lens geometric center (the specifications lens power with the monofocal spherical contact lens) is −10.00 D, which is shown by a solid line in the graphs of FIGS. 5 and 6, the change volume of the lens power due to the spherical aberration at the outermost circumference of the optical zone is roughly −3.00 D, and the lens power at the outermost circumference of the optical zone is roughly −13.00 D.

With the presbyopia contact lens 12, the radial lens power profile of the distance region 22 is designed to correspond to the lens power profile of the monofocal spherical contact lens that changes in the radial direction due to the spherical aberration and the like, and the lens power changes so as to gradually become greater to the minus side toward the outer circumference side. With this embodiment, the curve showing the lens power profile of the distance region 22 is defined by a quadratic function considering the aberration of the monofocal spherical contact lens, and the rate-of-change of the lens power with the distance region 22 continuously changes in the radial direction.

Also, with the monofocal spherical contact lens, the spherical aberration becomes larger as the absolute value of the specifications lens power increases, and the change volume of the lens power in relation to the lens geometric center becomes larger at the outermost circumference of the optical zone. In light of that, in the presbyopia contact lens set 10, with the presbyopia contact lenses 12c to 12e for which the specifications lens power has a minus diopter, the function of the power profile curve with the distance region 22 differs according to the specifications lens power. Specifically, with the presbyopia contact lenses 12c to 12e, the rate-of-change of the radial lens power with the distance region is made larger as the specifications lens power is made smaller. And the radial lens power profile corresponding to the spherical aberration of the monofocal spherical contact lens that differs for every specifications lens power is set for the distance region 22 of each of the presbyopia contact lenses 12c to 12e.

Furthermore, the difference between the rate-of-change of the radial lens power with the distance region 22 of each of the presbyopia contact lenses 12a to 12e and the rate-of-change of the radial lens power of the monofocal spherical contact lens of the same specifications lens power as the corresponding presbyopia contact lenses 12a to 12e is preferably set to be ±0.50 D/mm or less. More preferably, the difference in the rate-of-change of the radial lens power is set to be ±0.20 D/mm or less.

Furthermore, the difference between the lens power of the distance region 22 of each of the presbyopia contact lenses 12a to 12e and the lens power of the monofocal spherical contact lens of the same specifications lens power as the corresponding presbyopia contact lenses 12a to 12e is preferably set to be ±1.00 D or less.

Furthermore, the difference between the maximum value and the minimum value of the lens power in the distance region 22 of the presbyopia contact lenses 12a to 12e is preferably 0.30 D or greater, and more preferably 0.50 D or greater.

With this embodiment, in each presbyopia contact lens 12a to 12e, each curve showing the lens power profile of the distance region 22 is defined by one function, and the virtual lens power shown at the lens geometric center by that function (in FIG. 3, the intersection of the fine line extending from the curve showing the lens power profile of the distance region 22 and the graph vertical axis) is used as the specifications lens power of the presbyopia contact lens 12.

Also, with the monofocal spherical contact lens for which the specifications lens power has a plus diopter, lens power is added to be gradually greater to the plus side as it goes toward the outer circumference side due to the spherical aberration. On the other hand, with the presbyopia contact lenses 12a and 12b for which the specifications lens power has a plus diopter, as shown in FIGS. 3 and 4, roughly the same lens power profile curve is set for which the lens power becomes gradually larger to the minus side toward the outer circumference side. This is because, if the lens is set such that the lens power profile of the near region 20 becomes gradually larger to the plus side toward the inner circumference side, and the lens power profile of the distance region 22 becomes gradually larger to the plus side toward the outer circumference side, there is a risk of abnormal halation or glare occurring when point light sources are seen at night, and this has a markedly adverse effect on vision.

With this embodiment, even the presbyopia contact lenses for which the value of the lens power is set to be small and negative, is set to have the same radial lens power profile as that of the presbyopia contact lenses 12a and 12b whose lens power is set to be positive. More specifically, with the presbyopia contact lenses having a lens power which is −2.00 D or greater on the plus side, roughly a constant radial lens power profile is set. Said another way, the radial lens power profile of the distance region 22 of the presbyopia contact lens for which the specifications lens power is −2.00 D is used for all the presbyopia contact lenses of a specifications lens power greater to the plus side than −2.00 D, and an improvement in vision can be obtained by setting the depth of focus to be deep.

As is clear from the description above, the function that defines the radial lens power profile in the distance region 22 is set according to the specifications lens power, which does not necessarily mean that the radial lens power profile is different for all the presbyopia contact lenses with different specifications lens powers. In specific terms, for example, with the presbyopia contact lenses with a large specifications lens power, it is possible to have the function that defines the radial lens power profile of the distance region 22 be roughly the same.

In this embodiment, with the presbyopia contact lenses 12a to 12e, the difference between the maximum lens power and the minimum lens power of the near region 20 is made to be mutually the same. Accordingly, the diameters of the near regions 20 with the presbyopia contact lenses 12a and 12b for which the radial lens power profiles are common are mutually the same, and with the presbyopia contact lenses 12b to 12e for which radial lens power profiles are mutually different, the diameters of the near regions 20 are mutually different. Also, since the diameter of the optical zone 16 is determined according to the cornea diameter or the like, the diameter of the near region 20 (Cp) is preferably set to between 1.0 to 6.0 mm.

Also, the difference between the maximum value and the minimum value of the lens power of the near region 20, which is the plus diopter with respect to the specification lens power, is preferably 2.5 D or less, and with this embodiment, a difference of 1.5 D is set.

Furthermore, it is not necessary that all the presbyopia contact lenses 12a to 12e constituting the presbyopia contact lens set 10 have the setting such that item with a small specifications lens power has a larger rate-of-change of the radial lens power in the distance region 22 than item with a large one. With this embodiment, the rates-of-change of the radial lens power in the presbyopia contact lenses 12a and 12b are roughly and mutually the same.

The presbyopia contact lens 12 constituted as described above, as is well known from the past, is formed by a synthetic resin being molded or cut etc. so that the designated optical characteristics (radial lens power profile) are set for each the near region 20 and the distance region 22 including the constant power region 24. Also, if the target lens power is given together with the physical characteristics of the used lens material such as the refractive index, the lens surface shape given to both lens surfaces by forming can be determined with good precision by calculation by using software known from the past for designing lenses according to a ray tracing method, for example.

With this kind of presbyopia contact lens set 10 constituted according to this embodiment, when shifting from monofocal spherical contact lenses, the depth of focus, which was deep at the distance side due to the spherical aberration with the monofocal spherical contact lenses worn by the user before shifting, is maintained based on the radial lens power profile of the distance region 22 with the presbyopia contact lenses 12. Because of that, it is possible to obtain a higher value in the depth of focus compared to the monofocal spherical contact lens, using the plus additional diopter power added to the near region 20. This enables to set a broad accommodation range from near to far to provide even better vision.

Furthermore, the presbyopia contact lenses 12a to 12e have the radial lens power profile of the distance region 22 set according to the specifications lens power, and items with a small specifications lens power rather than a large one have a larger rate-of-change of the radial lens power in the distance region 22. By so doing, it is possible to have the radial lens power profile of the distance region 22 correspond to the spherical aberration of the monofocal spherical contact lens which differs according to the specifications lens power. Accordingly, it is possible to reduce or eliminate deterioration in vision when shifting from monofocal spherical contact lenses to the presbyopia contact lenses 12.

In fact, when the monofocal spherical contact lens is for correcting myopia, by designing the radial lens power profile of the distance region 22 of the presbyopia contact lens 12 considering the radial lens power profile of the monofocal spherical contact lens, it is possible to have the optical characteristics of the distance region 22 approach the optical characteristics of the monofocal spherical contact lens. As a result, a sense of discomfort or dissatisfaction with corrected eyesight during far distance observation decreases, which makes it easier to shift to the presbyopia contact lenses 12.

In particular, with this embodiment, the difference between the rate-of-change in the radial direction of the lens power of the distance region 22 and the rate-of-change in the radial direction of the lens power of the monofocal spherical contact lens is ±0.2 D/mm or less. By so doing, the optical characteristics of the distance region 22 approach the optical characteristics of the monofocal spherical contact lens, and it is possible to obtain good corrected eyesight for far distance observation.

In addition, with this embodiment, the difference between the lens power with the distance region 22 of the presbyopia contact lenses 12a to 12e and the lens power of the monofocal spherical contact lenses of the same specifications lens power as the presbyopia contact lenses 12a to 12e is ±1.0 D or less. Because of that, when shifting from spherical contact lenses to the presbyopia contact lenses 12, by using the presbyopia contact lenses 12 of the same or roughly the same specifications lens power as that of the monofocal spherical contact lenses, it is possible to provide good distance vision.

Also, with the presbyopia contact lenses 12a to 12e, the lens power gradually becomes smaller as either of the near region 20 or the distance region 22 goes toward the outer circumference side. Compared to the lens power at the innermost circumference, the lens power at the outermost circumference is more negative, and the function curve expressing the radial lens power profile does not have an inflection point at which the rate-of-change of the radial lens power turns positive. As a result, worsening of glare or halation at the inflection point is prevented, and for example, when viewing a point light source such as an automobile headlight or the like at night, it is possible to prevent marked deterioration in vision.

Also, with the presbyopia contact lenses 12a to 12e, the change volume of the lens power of the distance region 22 is set to be sufficiently large, and with this embodiment, the difference between the maximum value and the minimum value of the lens power of the distance region 22 is 0.30 D or greater. As a result, a high value of the depth of focus is set based on the continuous change in lens power in the distance region 22, and it is possible to obtain a broad accommodation range by which it is possible to view up to further distances.

Also, with the presbyopia contact lenses 12a to 12e, the maximum value of the lens power of the near region 20 is +2.5 D or less. Consequently, problems such as distortion or shaking in vision, or narrowing of the field of view or the like are prevented. This makes it possible to set effective optical characteristics using the near region 20 of practical diameter and thickness, enabling to provide excellent vision.

Furthermore, the diameter of the near region 20 is 1.0 to 6.0 mm, and with this embodiment, it is set to between 1.2 mm to 2.5 mm. By so doing, with the optical zone 16 with a diameter set according to the cornea size or the like, it is possible to set the near region 20 and the distance region 22 with the respectively necessary radial direction dimensions.

Figure 7:
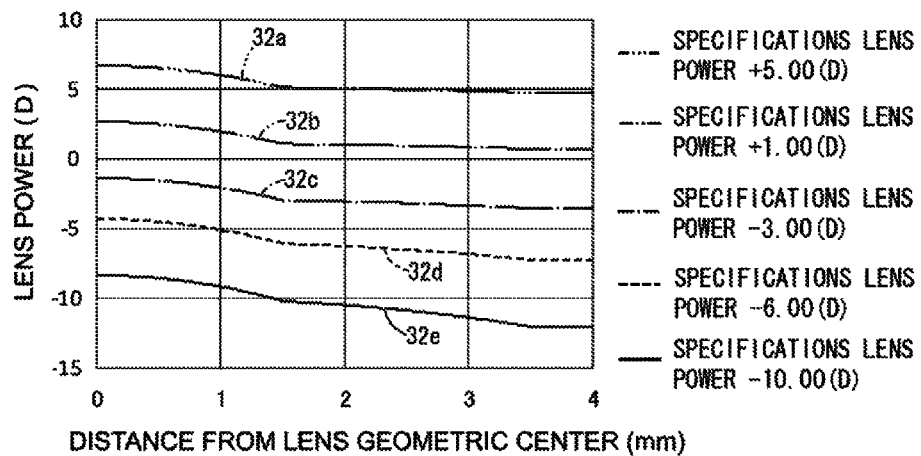
FIG. 7 is a graph showing the lens power profile of the presbyopia contact lens of the presbyopia contact lens set as a second embodiment of the present invention.
Figure 8:
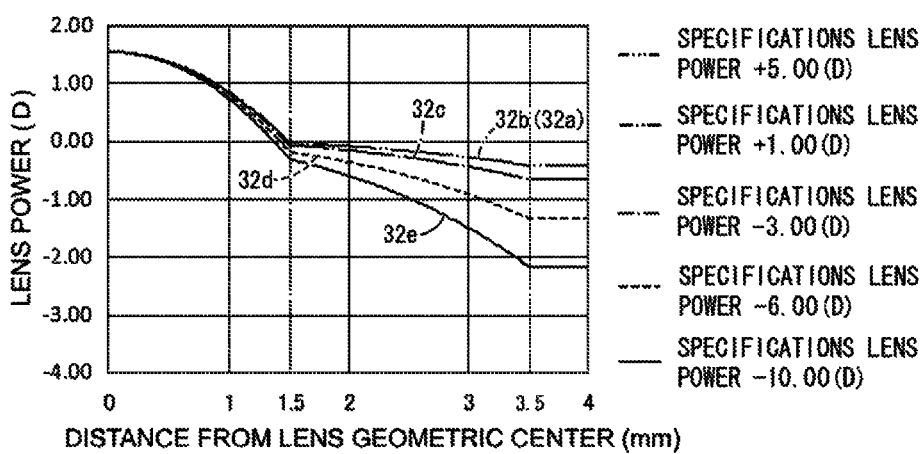
FIG. 8 is a graph showing the radial direction change volume of the lens power of the presbyopia contact lens shown in FIG. 7.

FIGS. 7 and 8 show graphs indicating the radial lens power profile of five types of presbyopia contact lenses 32a to 32e constituting the presbyopia contact lens set as a second embodiment of the present invention.

The five types of presbyopia contact lenses 32a to 32e, similar to the presbyopia contact lenses 12a to 12e of the first embodiment, have mutually different specifications lens powers, and the radial direction dimensions, with the near region 20 and the distance region 22, are roughly mutually the same. By so doing, the presbyopia contact lenses 32b to 32e, which have different radial lens power profile, have mutually different lens powers at the outermost circumference of the near region 20 and the innermost circumference of the distance region 22.

In this way, the plurality of types of presbyopia contact lenses constituting the presbyopia contact lens set do not necessarily have to have mutually the same lens power for the outermost circumference of the near region 20 and the innermost circumference of the distance region 22. For example, it is also possible to determine the connection position of the near region 20 and the distance region 22 by the distance from the lens geometric center.

Naturally, the method of setting the connection position of the near region 20 and the distance region 22 shown with this embodiment is nothing more than an example, and the boundary position of the near region 20 and the distance region 22 can be set freely according to the required optical characteristics or the like.

The results of the sensory tests performed by having test subjects wear the presbyopia contact lenses according to the present invention shown in the first embodiment will be described as Example hereafter. Naturally, this Example does not limit the present invention in any way.

Example

With this Example, first prepared were monofocal spherical contact lenses (example before the shift), the presbyopia contact lenses constituted according to the present invention (Example), and the presbyopia contact lenses noted in Japanese Unexamined Patent Publication No. JP-A-5-181096 (Comparative Example). Each of the contact lenses of the example before the shift, Example, and Comparative Example are formed using the kind of specification in Table 1, where the presbyopia contact lenses of Example have the radial lens power profile shown in the graph in FIG. 9A, and the presbyopia contact lenses of Comparative Example have the radial lens power profile shown in the graph in FIG. 9B. With the graph in FIG. 9A, the dotted line shows the radial lens power profile of the monofocal spherical contact lenses (example before shifting), the dot-dash line shows that of the presbyopia contact lenses of the present invention of the same specifications lens power as the specifications lens power of the monofocal spherical contact lenses, and the solid line shows that of the presbyopia contact lenses of the present invention with a prescription lens power (Example) whose corrected vision for distance observation is near that of the monofocal spherical contact lenses. Similarly, with the graph in FIG. 9B, the dotted line shows the radial lens power profile of the monofocal spherical contact lenses (example before shifting), the dot-dash line shows that of the presbyopia contact lenses of a conventional example of the same specifications lens power as the specifications lens power of the monofocal spherical contact lenses, and the solid line shows that of the presbyopia contact lenses according to the conventional example of prescription lens power (Comparative Example). The lens material "asmofilcon A" shown in Table 1 is the name of a silicone hydrogel.

TABLE 1

|  | Monofocal spherical CL | Comparative Example | Example |
|---|---|---|---|
| Design | Monofocal spherical | JP-A-5-181096 | First embodiment |
| Material | Asmofilcon A | ← | ← |
| Base curve | 8.60 mm | ← | ← |
| Diameter | 14.0 mm | ← | ← |
| Lens power in the distance region | +1.00 D to −5.00 D | ← | ← |
| Lens power in the near region | — | +1.50 D | +1.50 D |

Next, the monofocal spherical contact lenses, the presbyopia contact lenses of Example, and the presbyopia contact lenses of Comparative Example were worn by twelve test subjects, to confirm that distance vision was sufficiently clear (Table 2). The twelve test subjects all wore monofocal spherical contact lenses from the past, and were men and women around fifty years of age who had initial symptoms of presbyopia.

TABLE 2

|  | Monofocal spherical CL | Conventional Art | Embodiment |
|---|---|---|---|
| Distance vision that can be used daily | 12 | 12 | 12 |
| Distance vision that cannot be used daily | 0 | 0 | 0 |

Furthermore, compared to when wearing the monofocal spherical contact lenses of the example before shifting, respectively in regards to the presbyopia contact lenses of Example and the presbyopia contact lenses of Comparative Example, we had the twelve test subjects evaluate whether the near vision was good or poor (Table 3). Here, as the vision evaluation, Δ (no change) was used for the same vision as the case of wearing the monofocal spherical contact lenses of the example before shifting, x was used when the vision worsened due to the shift to the presbyopia contact lenses (worse by one level), O was used when the vision was slightly improved (better by one level), and a double concentric circle was used when the vision was greatly improved (better by two levels).

TABLE 3

|  | Conventional Art | Example |
|---|---|---|
| Worse by one level compared with monofocal spherical CL (x) | 1 | 0 |
| No change (Δ) | 7 | 4 |
| Better by one level compared with monofocal spherical CL (O) | 4 | 5 |
| Better by two levels compared with monofocal spherical CL (double concentric circle) | 0 | 3 |

As a result, with the presbyopia contact lenses of Comparative Example, eight out of twelve people evaluated their vision as not changing or in fact being worse than with the monofocal spherical contact lenses. On the other hand, with the presbyopia contact lenses of Example, four out of the twelve people evaluated their vision as not changing, and there were no evaluations that their vision had in fact gotten worse.

Meanwhile, with the presbyopia contact lenses of Comparative Example, evaluations that vision improved compared to the monofocal spherical contact lenses were obtained from four out of twelve people, but there were no test subjects who evaluated the vision as having improved by two levels. In comparison to that, with the presbyopia contact lenses of Example, eight out of twelve people evaluated vision as having improved, and of those, three people evaluated their vision as having improved by two levels.

In this way, with the presbyopia contact lenses of Example of the present invention, compared to the presbyopia contact lenses of Comparative Example of the conventional art constitution, when shifting from the monofocal spherical contact lenses, the trend for the vision to further improve was also clear from the results of the sensory tests.

Furthermore, as shown in FIG. 9, with the presbyopia contact lenses of the present invention, the corrected eyesight for far distance observation is closer to the monofocal spherical contact lenses of the same specifications lens power, compared to the presbyopia contact lenses of the conventional art constitution. As a result, the specifications lens power of the presbyopia contact lenses to be prescribed are close to the specifications lens power of the monofocal spherical contact lenses worn by the user, and it is easy to provide presbyopia contact lenses which suit for the user. With Example, in the presbyopia contact lenses of Example of the present invention, the difference between the specifications lens power of the monofocal spherical contact lenses and the prescription lens power of the presbyopia contact lenses was −0.49 D. By comparison, in the presbyopia contact lenses of Comparative Example, the difference was −0.83 D. Naturally, the difference between the specifications lens power of the monofocal spherical contact lenses and the prescription lens power of the presbyopia contact lenses changes according to things such as a difference in the specifications lens power of the monofocal spherical contact lenses, and a difference in the level of the spherical aberration accompanying that, therefore it should not be interpreted as a limiting factor. However, when the difference between the specifications lens power of the monofocal spherical contact lenses and the prescription lens power of the presbyopia contact lenses was measured for the twelve test subjects, with Example, it was −0.49 D±0.25 D, whereas with Comparative Example, it was −0.83 D±0.54 D. From the fact that there was a marked difference in the results as well, it is clear that it is easier to prescribe the presbyopia contact lenses of the present invention than those of the conventional art.

Above, the embodiments of the present invention were described, but the present invention is not limited by those specific descriptions. For example, the presbyopia contact lens set is not limited to an item constituted by a combination of five types of the presbyopia contact lenses, and it is possible to constitute this with a combination of two to four types, and also possible to constitute it with a combination of six or more types. Furthermore, all the specifications lens powers of the presbyopia contact lenses combined as the presbyopia contact lens set are merely shown as examples.

Also, all the presbyopia contact lenses constituting the presbyopia contact lens set do not have to be of mutually different lens powers, and for example, the presbyopia contact lens set can also be constituted including the presbyopia contact lenses for which the lens powers are the same but the ADDs are different.

The method of setting the specifications lens power for the presbyopia contact lenses 12 of the embodiments noted above is only an example. For example, the lens power of the lens geometric center can be used as the specifications lens power, or the lens power at the outermost circumference of the optical zone 16 can be used as the specifications lens power.

Also, the constant power region 24 does not necessarily have to be provided at the outermost circumference part of the optical zone 16, and it is also possible to provide it at the center part of the near region 20, or at the connection part of the near region 20 and the distance region 22. Furthermore, there does not have to be the constant power region 24, and it is also possible to have the lens power of the overall optical zone 16 continuously change in the radial direction.

With this embodiment, the same radial lens power profile is set for the presbyopia contact lenses 12a and 12b having a specifications lens power further to the plus side than −2.00 D, but for example, it is also possible to set radial lens power profile that differs according to the specifications lens power even for the presbyopia contact lenses for which a lens power on the plus side of −2.00 D is set.

Furthermore, as with the embodiments noted above, when setting a fixed radial lens power profile for the presbyopia contact lenses having lens power of a designated threshold value or greater, the lens power that is the threshold value can be set freely without being an item limited to −2.00 D.

Also, the function used for defining the radial lens power profile is acceptable as long as it is able to approximately set the spherical aberration, and for example aside from the quadratic function shown by example, it is also possible to use a linear function, a multi-linear function of third order or greater, a conic curve, a trigonometric function or the like.

KEYS TO SYMBOLS

10: Presbyopia contact lens set; 12, 32: Presbyopia contact lens; 16: Optical zone; 20: Near region; 22: Distance region; 24: Constant power region

The invention claimed is:

1. A presbyopia contact lens set comprising a plurality of progressive-type presbyopia contact lenses, each lens of the presbyopia contact lens set having an optical zone and different specifications lens powers and comprising:
  a near region defined by a center part of the optical zone of the lens, the near region configured to have a radial lens power profile defined by a first function; and
  a distance region defined by a peripheral part of the optical zone of the lens, the distance region configured to have a radial lens power profile defined by a second function that is different from the first function, the second function defining the radial lens power profile with the distance region being set for each lens depending on the specifications lens powers with the proviso that the lens set comprises successive lenses of differing specification lens powers including successive lenses of specification lens powers of −2.00 D or smaller and, for each lens of the presbyopia contact lens set having a specifications lens powers of −2.00 D or smaller, a rate-of-change of a radial lens power with the distance region of each successive lens of the group is made larger as the respective specifications lens power is made smaller.

2. The presbyopia contact lens set according to claim 1, wherein for each lens of the plurality of progressive-type presbyopia contact lenses the rate-of-change of the radial lens power with the distance region is set to have a difference of ±0.2 D/mm or less with respect to a rate-of-change of a radial lens power of a corresponding monofocal spherical contact lens of a same specifications lens power.

3. The presbyopia contact lens set according to claim 1, wherein for each lens of the plurality of progressive-type presbyopia contact lenses a lens power in the distance region is set to have a difference of ±1.0 D or less with respect to a lens power of a corresponding monofocal spherical contact lens of a same specifications lens power.

4. The presbyopia contact lens set according to claim 1, wherein for each lens of the plurality of progressive-type presbyopia contact lenses, with each the near region and the distance region, a lens power at an outermost circumference is more negative than a lens power at an innermost circumference, and there is no inflection point at which a rate-of-change of a radial lens power turns positive.

5. The presbyopia contact lens set according to claim 1, wherein for each lens of the plurality of progressive-type presbyopia contact lenses a difference between a maximum value and a minimum value of a lens power in the distance region is 0.3 D or more.

6. The presbyopia contact lens set according to claim 1, wherein for each lens of the plurality of progressive-type presbyopia contact lenses a difference between a maximum value and a minimum value of a lens power in the near region is 2.5 D or less.

7. The presbyopia contact lens set according to claim 1, wherein the plurality of progressive-type presbyopia contact lenses are mutually the same in terms of a difference between a maximum value and a minimum value of a lens power in the near regions.

8. The presbyopia contact lens set according to claim 1, wherein a diameter of the near region is in the range of 1.0 to 6.0 mm in the plurality of progressive-type presbyopia contact lenses.

9. The presbyopia contact lens set according to claim 1, wherein for each lens of the plurality of progressive-type presbyopia contact lenses a constant power region where a lens power is fixed at a designated width in a radial direction is provided at an outermost circumference side of the distance region.

10. A designing method of a presbyopia contact lens set comprising a plurality of progressive-type presbyopia contact lenses, each lens including an optical zone having a near region at its center part and a distance region at its peripheral part, the method comprising:

setting a lens power profile for each lens that corresponds to a spherical aberration of a monofocal spherical contact lens of a same specifications lens power as a radial lens power profile in the distance region of the presbyopia contact lens; and designing each of the plurality of presbyopia contact lenses by different specifications lens powers applied thereto such that the lens set comprises successive lenses of differing specification lens powers including successive lenses of specification lens powers of −2.00 D or smaller and, for each lens of the presbyopia contact lens set having a specifications lens powers of −2.00 D or smaller, a rate-of-change of a radial lens power with the distance region of each successive lens of the group is made larger as the respective specifications lens power is made smaller.

11. The designing method of the presbyopia contact lens set according to claim 10, wherein for each lens of the plurality of progressive-type presbyopia contact lenses the radial lens power profile in the distance region is set so that a rate-of-change of a radial lens power in the distance region is different from a rate-of-change of a radial lens power of the corresponding monofocal spherical contact lens by ±0.2 D/mm or less.

12. The designing method of the presbyopia contact lens set according to claim 10, wherein for each lens of the plurality of progressive-type presbyopia contact lenses the lens power profile in the distance region is set so that a radial lens power in the distance region is different from a radial lens power of the corresponding monofocal spherical contact lens by ±1.0 D or less.

13. A manufacturing method of a presbyopia contact lens set comprising forming the progressive-type presbyopia contact lenses of the contact lens set according to the designing method of claim 10.

* * * * *